United States Patent [19]
Nagy

[11] 3,851,919
[45] Dec. 3, 1974

[54] AUTOMOBILE HEADREST

[76] Inventor: James P. Nagy, 6127 McKenzie Rd., North Olmstead, Ohio 44070

[22] Filed: Aug. 1, 1973

[21] Appl. No.: 384,485

[52] U.S. Cl................... 297/395, 297/410, 248/118
[51] Int. Cl................................................ A47c 7/36
[58] Field of Search .......... 297/216, 217, 391, 395, 297/396, 410, 427; 248/118

[56] References Cited
UNITED STATES PATENTS

| | | | |
|---|---|---|---|
| 2,649,142 | 8/1953 | New | 297/395 |
| 3,220,770 | 11/1965 | Schaeffer | 297/391 |
| 3,578,383 | 5/1971 | Earl | 297/391 |
| 3,601,445 | 8/1971 | Glynias | 248/118 |

*Primary Examiner*—Casmir A. Nunberg

[57] ABSTRACT

A headrest is adapted to be supported from the window of an automobile or other vehicle. A bracket is hooked at one end to the top edge of a window and is supported to extend downwardly within the vehicle. A head support is adjustably secured to the bracket so that it may be adjusted to a desired height. A window spacer mechanism serves to adjustably vary the spacing between the window's side surface and the bracket, and thereby vary the extent that the head support extends into the vehicle.

7 Claims, 3 Drawing Figures

PATENTED DEC 3 1974  3,851,919
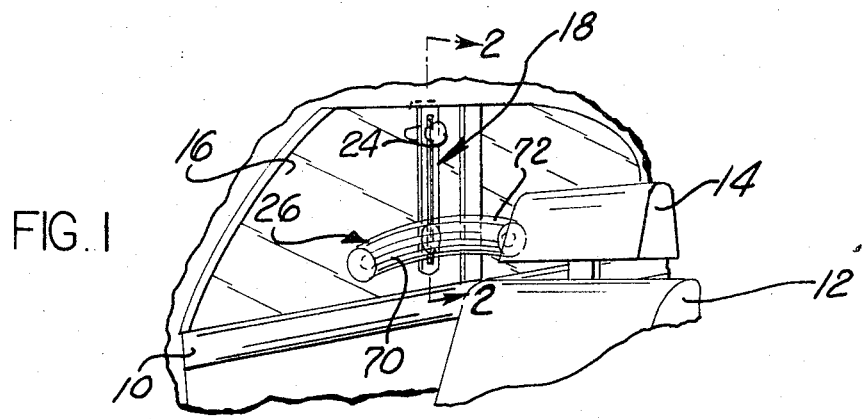
FIG. 1
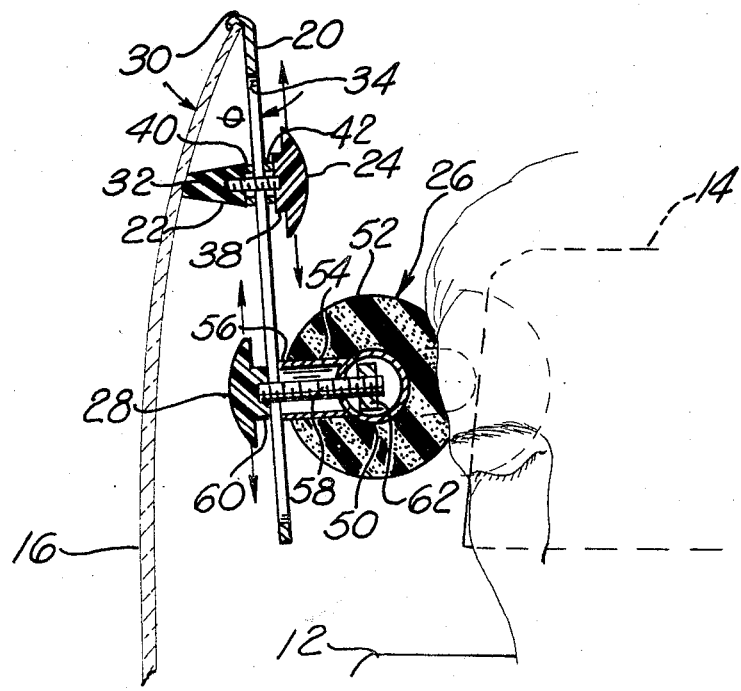
FIG. 2
FIG. 3
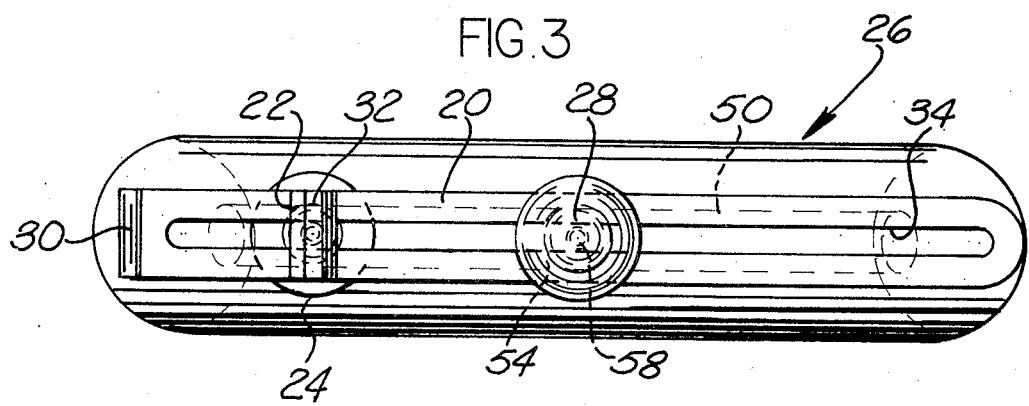

AUTOMOBILE HEADREST

This invention is directed to the art of headrests for automobiles or other vehicles and, more particularly, to a headrest which is adapted to be supported from the window of an automobile or other vehicle.

The invention is particularly applicable for use as a side headrest supported from a side window of an automobile, such that a vehicle occupant may rest his head to one side of himself, although the invention is not limited thereto and may be used as a headrest for the back of the occupant's head, such as when the headrest is mounted, for example, to the rear window of a station wagon.

Automobile headrests are typically permanently or semipermanently mounted to the front seat backs. Whereas some headrests are adjustable for height they do not provide support for an occupant wishing to rest his head to one side of himself, such as against the vehicle's side window. To obtain such support an occupant typically employs a pillow, or the like, wedged between the front seat and the side window. Since the pillow is not secured to the window it will slip from place as the occupant moves his head.

The present invention is directed toward an improved headrest particularly applicable for use by a vehicle occupant for resting his head to one side of himself in such a manner that as the occupant moves his head from side-to-side the headrest stays in place.

It is therefore an object of the present invention to provide an improved headrest adapted to be supported by a vehicle window.

It is a still further object of the present invention to provide such a headrest which may be adjusted to a desired height at which an occupant desires to rest his head.

Another object of the present invention is to provide an auxiliary headrest adapted to be secured to a vehicle side window and curved inwardly toward a headrest mounted to an adjacent seat back to provide a substantially 90° support surface area for a passenger's head.

A still further object of the present invention is to provide an auxiliary headrest which may be securely fastened to a vehicle side window, or the like, and which may be easily removed from the side window and folded into a collapsed condition for storage.

A still further object of the present invention is to provide an auxiliary headrest particularly adapted to be mounted to a vehicle side window and is adjustable as to the extent that the headrest extends inwardly of the vehicle from the side window.

In accordance with one aspect of the present invention, the headrest employs an elongated bracket having a hooked portion at one end for receiving a portion of the top edge of a vehicle window so that the bracket is supported therefrom and extends downwardly from the top edge. An elongated head support member is secured to the bracket so as to face inwardly of the vehicle. The head support is secured to the bracket at a location intermediate its ends. Opposing leg portions of the head support extend inwardly of the vehicle from the intermediate location so that both of the opposite ends are located more inwardly from the automobile window than is the intermediate location.

In accordance with another aspect of the present invention, a head support member is carried by a bracket having a hooked portion at one end thereof so as to receive a portion of the top edge of a window, whereby the bracket is supported therefrom and extends downwardly with the head support member facing inwardly of the vehicle. An adjustable spacer mechanism serves to adjustably vary the extent that the head support member extends inwardly of the vehicle from the window.

The foregoing and other objects and advantages of the invention will become more readily apparent from the following description of the preferred embodiment of the invention as taken in conjunction with the accompanying drawings which are a part hereof and wherein:

FIG. 1 is a fragmentary perspective view illustrating the front passenger section of an automobile including a retractable side window, a seat back having a headrest secured thereto; and the auxiliary headrest constructed in accordance with the present invention and supported by the side window;

FIG. 2 is a sectional view taken generally along line 2—2 looking in the direction of the arrows of FIG. 1 showing the auxiliary headrest cooperating with the seat back headrest to provide head support for a vehicle passenger; and, FIG. 3 is a plan view illustrating the headrest folded to a collapsed condition.

Referring now to the drawings wherein the showings are for purposes of illustrating a preferred embodiment of the invention only, and not for purposes of limiting same, there is shown a portion of a vehicle including a front passenger door 10 and an adjacent front passenger seat back 12 having a vertically adjustable, conventional headrest 14 mounted thereto. A side passenger window 16 is carried by door 10 in a conventional manner so that the window may be raised and lowered, as with a window crank.

An auxiliary headrest 18, constructed in accordance with the present invention, is supported by side window 16 so as to extend into the interior of the vehicle to provide head support so that an occupant may rest his head to one side of himself. Headrest 18 is comprised of an elongated bracket 20 which carries a spacer 22, a spacer adjustment knob 24, a head support 26 and a head support adjustment knob 28.

Bracket 20 is preferably constructed of relatively rigid material, such as aluminum. One end of bracket 20 is bent over so as to form a hook 30 which is of sufficient size to loosely receive a portion of the length of the top edge of a vehicle window, such as window 16. The bracket is positioned so that hook 30 is in place on the upper edge of window 16, whereupon the bracket is supported by the window and extends downwardly along the interior side of window 16.

Spacer 22 serves to angularly displace bracket 20 from the planar surface of window 16 by an angle θ, which is increased as the spacer is displaced upwardly, as viewed in FIG. 2, and is decreased as the spacer is lowered. Consequently, adjustment in the positioning of spacer 22 serves to vary the extent that head support 26 extends inwardly of the vehicle from window 16.

Spacer 22 may take various forms, such as the wedge shaped structure shown in FIG. 2, having a cam surface 30 at one end thereof for camming against the planar surface of window 16 to vary angle. Various means may be incorporated to mount spacer 22 to bracket 20 so that it may be positioned at various locations along the longitudinal length of the bracket. Preferably, however, bracket 20 is provided with an elongated slot 34 which serves to receive a threaded member 36 extending from a shoulder portion 38 of knob 24 and through the slot 34. The free end of member 36 is threaded into a suitable aperture in the spacer 22. Washers 40 and 42 are respectively positioned intermediate bracket 20, and spacer 22 and between bracket 20 and the shoulder 38 of knob 24 to assist in providing slideable adjustment longitudinally of bracket 20.

Head support 26 includes a rigid, elongated tubular frame 50 covered with a cylindrical resilient padding 52, such as foam rubber or polyurethane foam, or the like. A rigid, cylindrical sleeve 54 is suitably secured, as by welding to an intermediate location of frame 50 and extends radially outward therefrom through padding 52 and terminates to define a cylindrical shoulder 56. Shoulder 56 slideably bears against one surface of bracket 20 and is of greater diameter than the width of slot 34. Adjustment knob 28, like adjustment knob 24, is provided with a threaded portion 58 extending from a shoulder 60 of the adjustment knob. Portion 58 extends through slot 34 and is of sufficient length to extend through sleeve 54 and, thence, through a suitable aperture in tubular frame 50. A nut 62 is located in the frame and threaded to the exposed end of threaded portion 58 to securely fasten head support 26 to the bracket 20.

Tubular frame 50 is curved from its intermediate portion so that leg portions 70 and 72 of the head support are curved inwardly of the vehicle from bracket 18. The included angle between leg portions 70 and 72 is on the order of 135°.

In use, the vehicle occupant may selectively position headrest 18 so that bracket 20 is positioned in alignment with seat 12. The extent by which head support 26 extends inwardly of the vehicle from window 16 may be adjusted by positioning spacer 22 longitudinally along slot 34. The height of the headrest may be adjusted by loosening knob 28 and raising or lowering support 26 as desired, and then tightening knob 28 when the head support is properly positioned. Head support leg 72 is now positioned so as to be curved inwardly toward the window facing edge of head support 14 on the vehicle seat back 12. This will provide substantially a 90° support area for the occupant's head.

When headrest 18 is not in use, knob 28 may be loosened so that brakcet 20 may be pivoted 90° and then locked by tightening knob 28 so that the headrest is in a collapsed condition, as shown in FIG. 3. In such a collapsed condition the headrest requires little space for storage, as in the vehicle's trunk.

In the drawings, window 16 is shown as having a concave interior surface for purposes of illustration only. Bracket 20 is equally applicable for use with automobile windows which are flat.

Although the invention has been described with respect to a preferred embodiment, it is not limited thereto as various modifications may be made without departing from the scope of the appended claims.

What is claimed is:

1. A vehicle headrest adapted to be supported by a window of a vehicle, said headrest comprising an elongated rigid bracket member, rigid hook means at one end portion of said rigid bracket member for engaging the top portion of the vehicle window and for supporting said rigid bracket member for pivotal movement toward and away from a major side surface of the window, head support means disposed on a first side of said rigid bracket member for engaging the head of an occupant of the vehicle, head support connector means for connecting said head support means to said rigid bracket member and for enabling the position of said head support means to be varied longitudinally along said rigid bracket member to adjust the position of said head support means relative to the top portion of the window to accommodate vehicle occupants of different sizes, and spacer means disposed on a second side of said rigid bracket member for engaging the major side surface of the window at a location disposed downwardly from the top portion of the window to hold said rigid bracket member and head support means outwardly from the major side surface of the window against the influence of force directed toward the major side surface of the window and applied against said head support means by the head of an occupant of the vehicle.

2. A vehicle headrest as set forth in claim 1 further including spacer connector means for connecting said spacer means to said rigid bracket member and for enabling the position of said spacer means to be varied longitudinally along said rigid bracket member to adjust the position of said spacer means relative to the top portion of the window and the distance which said head support means is disposed inwardly from the major side surface of the window.

3. A vehicle headrest as set forth in claim 1 wherein said rigid bracket member includes surface means for defining a longitudinally extending slot, said head support connector means extending through said slot and being operable between an engaged condition holding said head support means against movement relative to said rigid bracket member and a disengaged condition in which said head support connector means is movable along said slot to adjust the position of said head support means.

4. A vehicle headrest as set forth in claim 3 further including spacer connector means extending through said slot for connecting said spacer means to said rigid bracket member, said spacer connector means being operable between an engaged condition holding said spacer means against movement relative to said rigid bracket member and a disengaged condition in which said spacer connector means and said spacer means are movable along said slot to adjust the position of said spacer means relative to the top portion of the window.

5. A vehicle headrest as set forth in claim 1 wherein said head support means includes an intermediate portion connected with said rigid bracket member, a first side portion extending outwardly from said intermediate portion and inwardly in a first direction transverse to the major side of the window, and a second side portion extending outwardly from said intermediate portion and inwardly in a second direction transverse to the major side of the window so that both of said side portions have outer ends which are disposed further inwardly from the window than said intermediate portion.

6. A vehicle headrest adapted to be supported by a window of a vehicle, said headrest comprising an elongated rigid bracket member, rigid hook means at one end portion of said rigid bracket member for engaging the top portion of the vehicle window and for supporting said rigid bracket member for pivotal movement toward and away from a major side surface of the window, head support means disposed on a first side of said rigid bracket member for engaging the head of an occupant of the vehicle, head support connector means for connecting said head support means to said rigid bracket member, spacer means disposed on a second side of said rigid bracket member for engaging the major side surface of the window at a location disposed downwardly from the top portion of the window to hold said rigid bracket member and head support means outwardly from the major side surface of the window against the influence of force directed toward the major side surface of the window and applied against said head support means by the head of an occupant of the vehicle, and spacer connector means for connecting said spacer means to said rigid bracket member and for enabling the position of said spacer means to be varied longitudinally along said rigid bracket member to adjust the position of said spacer means relative to the top portion of the window and the distance which said head support means is disposed inwardly from the major side surface of the window.

7. A vehicle headrest as set forth in claim 6 wherein said rigid bracket member includes surface means for defining a longitudinally extending slot, said spacer connector means extending through said slot and being operable between an engaged condition holding said spacer means against movement relative to said rigid bracket member and a disengaged condition in which said spacer connector means is movable along said slot to adjust the position of said spacer means relative to the top portion of the window.

* * * * *